(12) United States Patent
Sakai et al.

(10) Patent No.: US 12,299,880 B2
(45) Date of Patent: May 13, 2025

(54) COMPUTER-READABLE RECORDING MEDIUM HAVING STORING THEREIN EVALUATING PROGRAM, EVALUATING APPARATUS, AND METHOD FOR EVALUATING

(71) Applicants: FUJITSU LIMITED, Kawasaki (JP); RIKEN, Wako (JP); National University Corporation Tokyo Medical and Dental University, Tokyo (JP); NATIONAL CANCER CENTER, Tokyo (JP)

(72) Inventors: Akira Sakai, Kawasaki (JP); Masaaki Komatsu, Koto (JP); Tetsuo Sasano, Bunkyo (JP); Hideki Arima, Bunkyo (JP); Ryuji Hamamoto, Chuo (JP)

(73) Assignees: FUJITSU LIMITED, Kawasaki (JP); RIKEN, Wako (JP); NATIONAL UNIVERSITY CORPORATION TOKYO MEDICAL AND DENTAL UNIVERSITY, Tokyo (JP); NATIONAL CANCER CENTER, Tokyo (JP)

( * ) Notice: Subject to any disclaimer, the term of this patent is extended or adjusted under 35 U.S.C. 154(b) by 539 days.

(21) Appl. No.: 17/826,158

(22) Filed: May 27, 2022

(65) Prior Publication Data
US 2022/0398727 A1    Dec. 15, 2022

(30) Foreign Application Priority Data
Jun. 10, 2021 (JP) .................................. 2021-097536

(51) Int. Cl.
*G06T 7/00* (2017.01)

(52) U.S. Cl.
CPC .......... *G06T 7/0012* (2013.01); *G06T 7/0002* (2013.01); *G06T 2200/24* (2013.01);
(Continued)

(58) Field of Classification Search
CPC ........... G06T 7/001; G06T 2207/10016; G06T 7/0002; G06T 2207/20081;
(Continued)

(56) References Cited

U.S. PATENT DOCUMENTS 5,121,438 A * 6/1992 Kawauchi ........ G01N 21/95607
    348/130
2008/0273027 A1* 11/2008 Feremans ............ H04N 13/334
    348/E13.067

(Continued)

FOREIGN PATENT DOCUMENTS

CN    112914610 A    6/2021
JP    2020-113083 A    7/2020

OTHER PUBLICATIONS

Nemes, et al., "Role of Parasternal Data Acquisition During Contrast Enhanced Real-Time Three-Dimensional Echocardiography", Department of Cardiology, Thoraxcentre, Erasmus MC, Rotterdam, The Netherlands, Journal compilation, 2007, Blackwell Publishing, Inc., 5pp, XP71678550A.

(Continued)

*Primary Examiner* — Ajibola A Akinyemi
(74) *Attorney, Agent, or Firm* — XSENSUS LLP

(57) ABSTRACT

A non-transitory computer-readable recording medium has stored therein an evaluating program for causing a computer to execute a process including: specifying a wall of an inspection target in two or more moving images being obtained by photographing two types of cross sections of the inspection target, the two types of cross sections being orthogonal to each other; evaluating photographing quality (Continued)

of each of a plurality of first divisional regions obtained by dividing a region corresponding to the wall specified in a first image related to a first cross section among the two or more moving images; and evaluating photographing quality of each of a plurality of second divisional regions obtained by dividing a region corresponding to the wall specified in a second image related to a second cross section among the two or more moving images, the second cross section being different from the first cross section.

20 Claims, 9 Drawing Sheets

(52) U.S. Cl.
CPC ............... *G06T 2207/10016* (2013.01); *G06T 2207/10132* (2013.01); *G06T 2207/20021* (2013.01); *G06T 2207/20081* (2013.01); *G06T 2207/30048* (2013.01); *G06T 2207/30168* (2013.01)

(58) Field of Classification Search
CPC . G06T 2207/20084; G06T 2207/30164; G06T 7/11; G06T 2207/20016; G06T 2207/30108; G06T 7/0004; G06T 7/0016; G06T 2207/30136; G06T 2207/30252; G06T 2207/10024; G06T 2207/10032; G06T 2207/10152

USPC ........................................................ 382/128
See application file for complete search history.

(56) References Cited

U.S. PATENT DOCUMENTS

| | | | |
|---|---|---|---|
| 2014/0185764 A1* | 7/2014 | Takenaka | H04N 5/32 378/91 |
| 2020/0226494 A1 | 7/2020 | Yasutomi et al. | |

OTHER PUBLICATIONS

Klitsie, et al., "Assessment of Intraventricular Time Differences in Healthy Children Using Two-Dimensional Speckle-TrackingEchocardiography", Leiden, The Netherlands, Journal of the American Society of Echocardiography, Jun. 2013, 11pp, XP28554503A.

Kulina, et al., "Beamforming algorithms for endocardial border detection", Wiley Echocardiography, icahn School of Medicine at Mount Sinai, New York, NY, 2018, 8pp, XP71681733A.

Extended European Search Report issued Nov. 15, 2022, in corresponding European Patent Application 22175764.4, 10pp.

* cited by examiner

COMPUTER-READABLE RECORDING MEDIUM HAVING STORING THEREIN EVALUATING PROGRAM, EVALUATING APPARATUS, AND METHOD FOR EVALUATING

CROSS-REFERENCE TO RELATED APPLICATION

This application is based upon and claims the benefit of priority of the prior Japanese Patent application No. 2021-097536, filed on Jun. 10, 2021, the entire contents of which are incorporated herein by reference.

FIELD

The embodiment discussed herein relates to a computer-readable recording medium having stored therein an evaluating program, an evaluating apparatus, and a method for evaluating.

BACKGROUND

One of evaluation schemes of the soundness or the like of a wall of a housing by an ultrasonic inspection obtains images of cross sections of a long axis and a short axis of a target and evaluates the soundness of the like using a combination of the images of the cross sections of the long axis and the short axis.

[Patent Document 1] Japanese Laid-Open Patent Publication No. 2020-113083

SUMMARY

According to an aspect of the embodiment, a non-transitory computer-readable recording medium has stored therein an evaluating program for causing a computer to execute a process including: specifying a wall of an inspection target in two or more moving images being obtained by photographing two types of cross sections of the inspection target, the two types of cross sections being orthogonal to each other; evaluating photographing quality of each of a plurality of first divisional regions obtained by dividing a region corresponding to the wall specified in a first image related to a first cross section among the two or more moving images; and evaluating photographing quality of each of a plurality of second divisional regions obtained by dividing a region corresponding to the wall specified in a second image related to a second cross section among the two or more moving images, the second cross section being different from the first cross section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
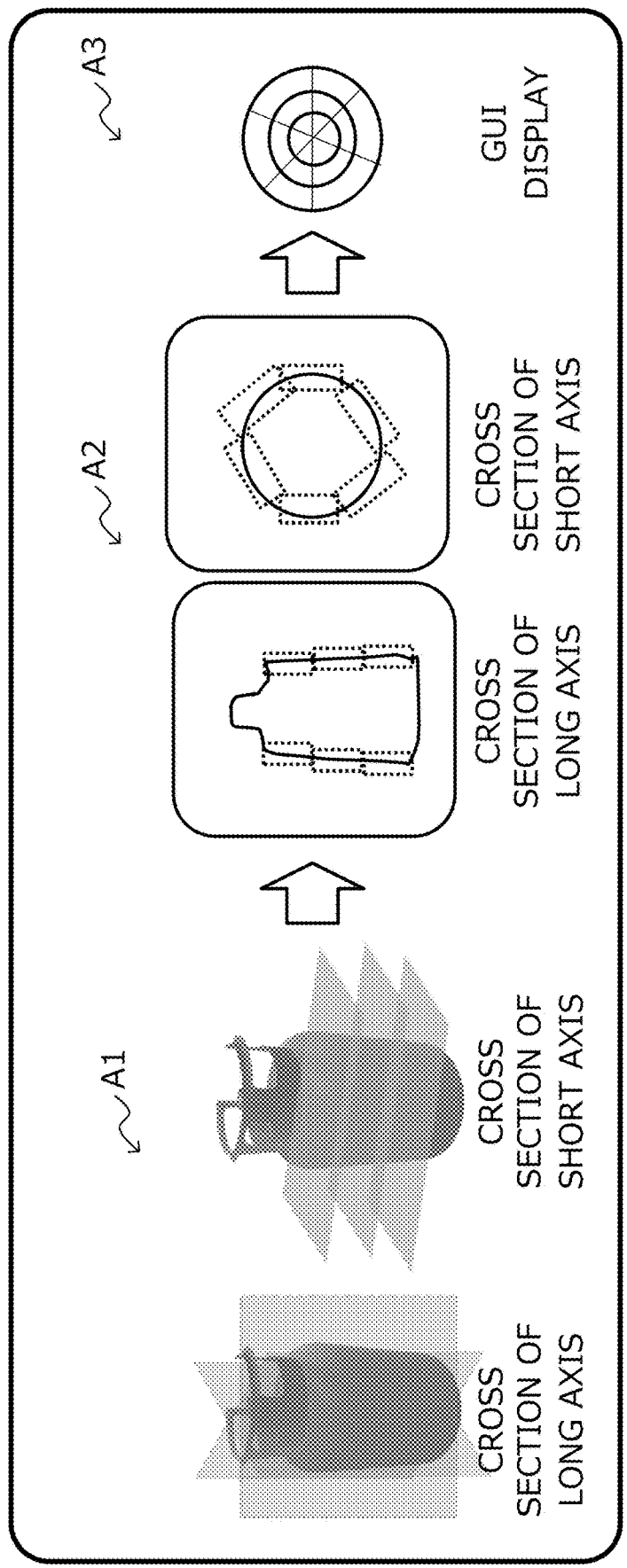
FIG. 1 is a diagram briefly illustrating an evaluating process according to an embodiment.

For the above, in evaluation of the soundness or the like of the wall of the housing by the ultrasonic inspection, whether or not the images of the cross sections which images are worthy of the inspection are obtained is important. If no images of a cross sections worthy of inspection is obtained, there is a possibility of not being able to precisely evaluate the soundness or the like of the wall of the housing.

<A> Embodiment

Hereinafter, an embodiment of the present invention will now be described with reference to the accompanying drawings. However, the embodiment described below is merely illustrative and there is no intention to exclude the application of various modifications and techniques that are not explicitly described in the embodiment. For example, the present embodiment can be variously modified and implemented without departing from the scope thereof. Each drawing may include additional functions in addition to the elements appearing on the drawing.

Like reference numbers designate the same or similar parts in the drawings, so repetitious description is omitted here.

In evaluation of the soundness or the like of the wall of the housing by the ultrasonic inspection, whether or not the images of the cross sections which images are worthy of the inspection are obtained is important. If no images of a cross sections worthy of inspection is obtained, there is a possibility of not being able to precisely evaluate the soundness or the like of the wall of the housing.

FIG. 1 is a diagram briefly illustrating an evaluating process according to an embodiment.

As indicated by the reference sign A1, multiple (e.g., three) moving images of cross sections of the long axis and multiple (e.g., three) moving images of cross sections of the short axis are photographed by an ultrasonic inspection. It is sufficient that a housing of an evaluation target has a wall. Since the housing illustrated in FIG. 1 has a longer vertical dimension and a shorter horizontal dimension, cross sections cut in the vertical direction are regarded as the cross sections of the long axis and cross sections cut in the horizontal direction are regarded as the cross section of the short axis. However, either the vertical length or the horizontal length of a housing of an evaluation target may be longer, so any housing can be used as an evaluation target.

As indicated by the reference sign A2, moving images of the cross sections of the long axis and moving images of the cross sections of the short axis are obtained. As indicated by broken-line frames on each of cross sections of the long axis and short axis of the reference sign A2, the position of the wall of the housing may be specified by a machine learning process.

As indicated by the reference sign A3, whether an image of the wall specified from the moving images of the cross sections of the long axis and the cross sections of the short axis is fine or poor is displayed on a GUI. Whether the image of the wall is fine or poor may be determined by a machine learning process. For example, the position of the wall in a fine photographing state may be displayed in white whereas the position of the wall in a poor photographing state may be emphasized by coloring in the GUI. The GUI display indicated by the reference sign A3 is a diagram viewed from a direction viewing the cross section of the short axis. The GUI display is segmented by multiple boundary lines extending from the center of the circle toward the circumference to define multiple divisional regions, and whether the image is fine or poor is displayed in respective circumference-shape divisional regions of the GUI which regions are associated with the positions of the wall on an outer circumference of the cross section of the short axis. Further, the GUI display is segmented by multiple concentric circles in the circle to define multiple divisional regions among which outer divisional regions of the GUI are associated with the position of the wall on an upper part of the cross section of the long axis and inner divisional regions of the GUI are associated with the position of the wall on a lower part of the cross section of the long axis, whether the image is fine or poor is displayed in respective associated divisional regions. A region of the GUI corresponding to the position where at least one of images of the wall of the cross sections of the long axis and the cross sections of the short axis is poor may be highlighted by coloring.

Figure 2:
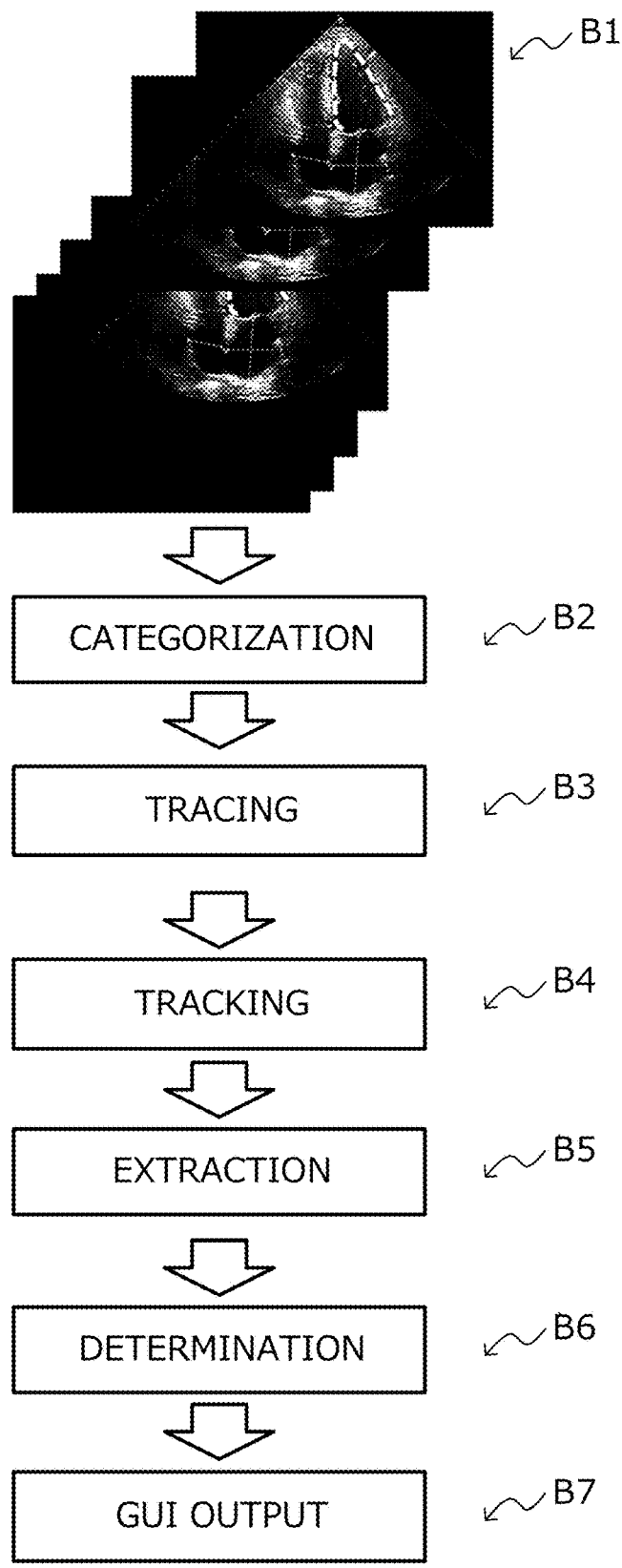
FIG. 2 is a flow diagram illustrating the evaluating process of the embodiment.
Figure 3:
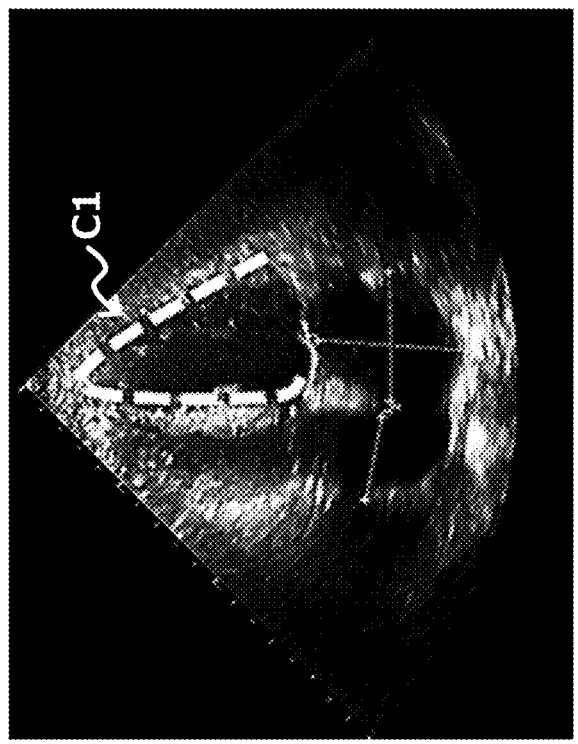
FIG. 3 is a diagram illustrating an example of an image for describing a tracing process of FIG. 2.
Figure 4:
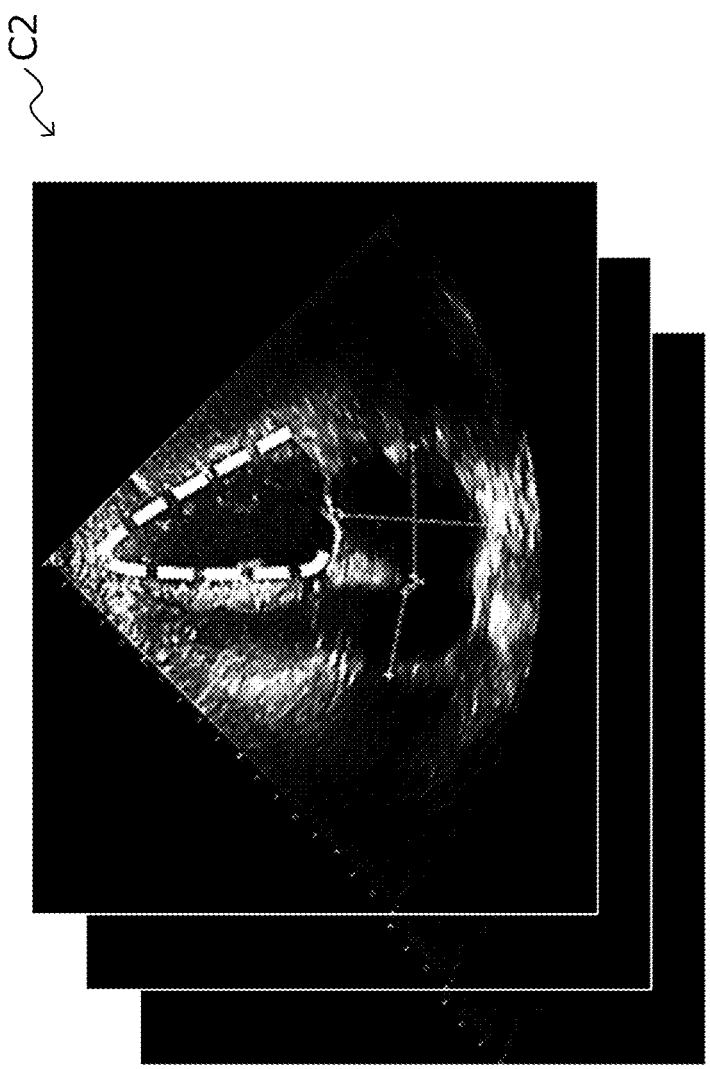
FIG. 4 is a diagram illustrating an example of an image for describing a tracking process of FIG. 2.
Figure 5:
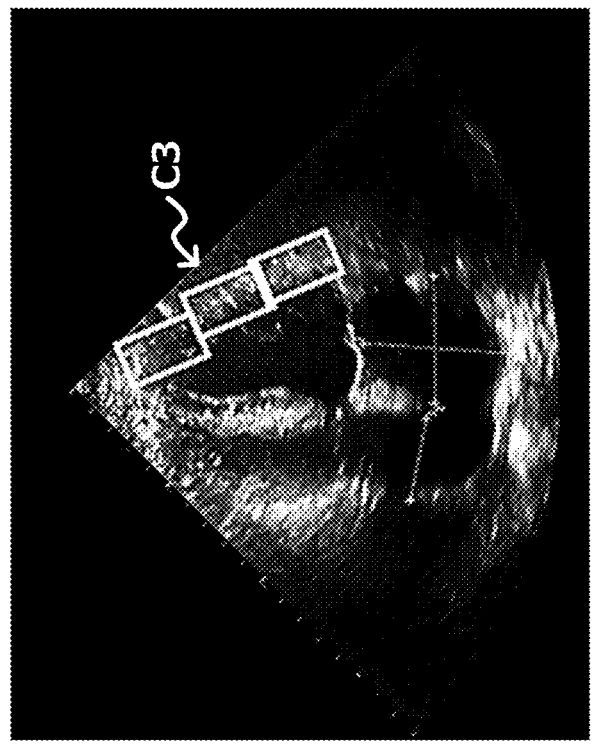
FIG. 5 is a diagram illustrating an example of an image for describing an extracting process of FIG. 2.
Figure 6:
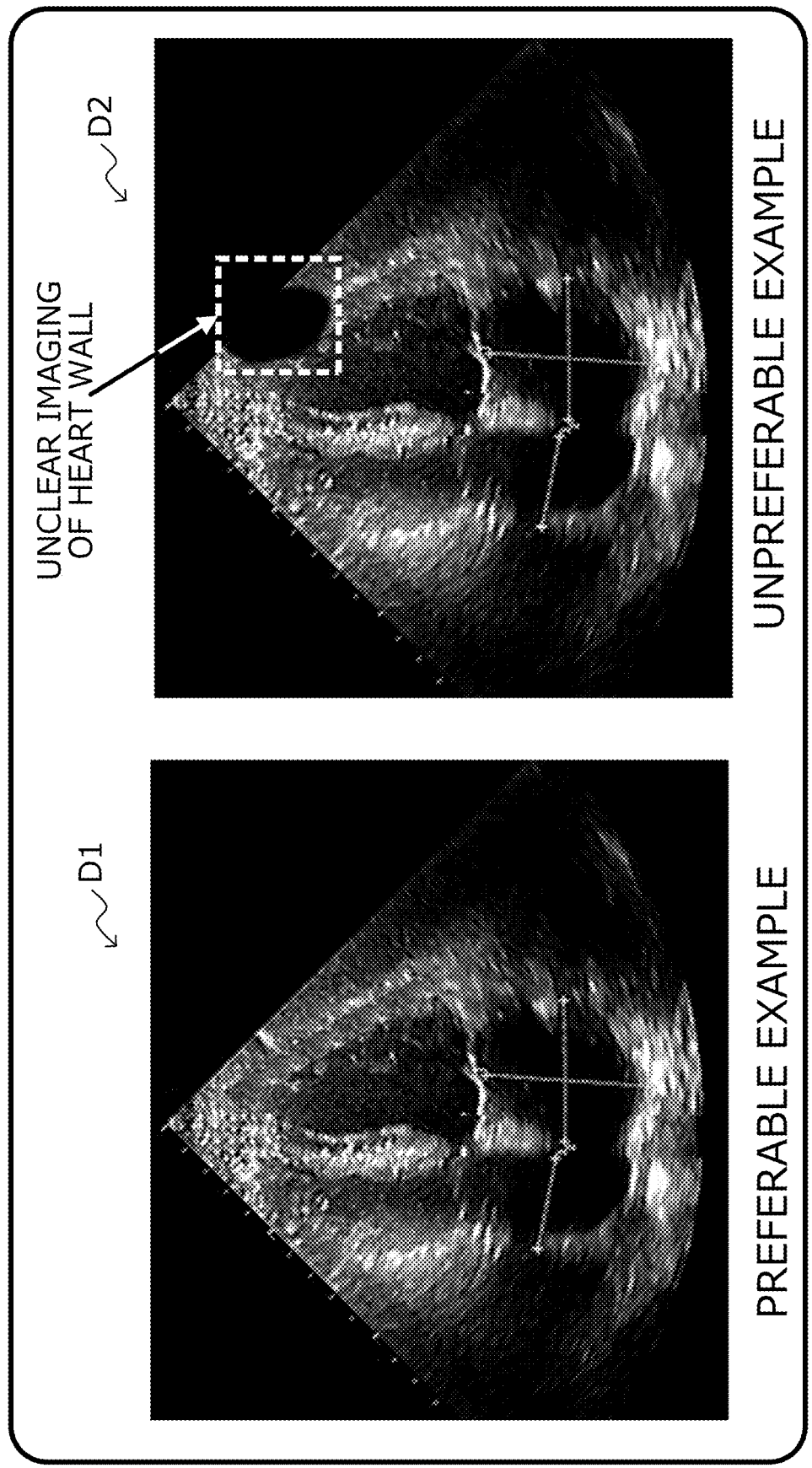
FIG. 6 is a diagram illustrating preferable and unpreferable examples of an image obtained in an evaluating process of the embodiment.
Figure 7:
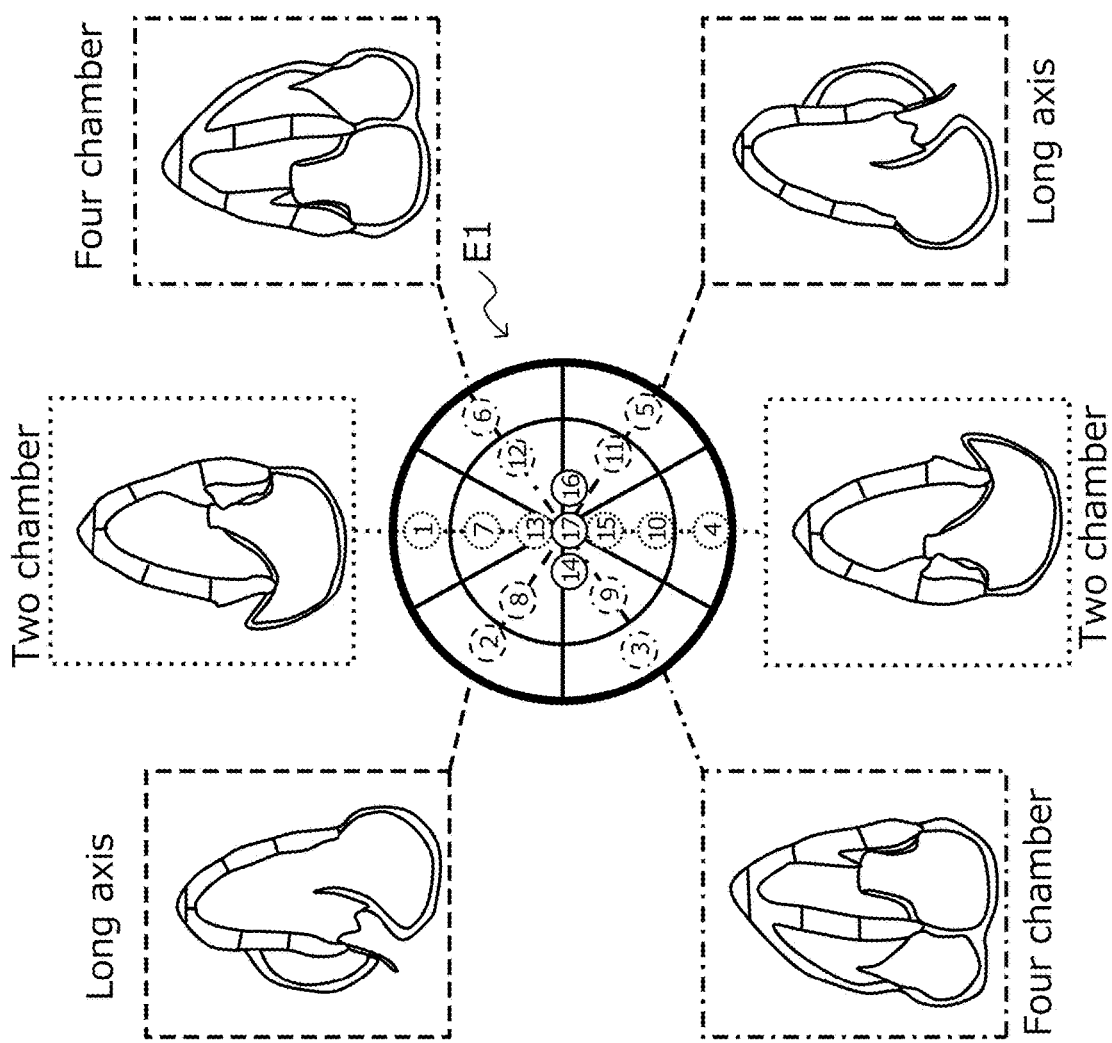
FIG. 7 is a diagram illustrating an example of a Graphic User Interface (GUI) output in a GUI outputting process of FIG. 2.

The evaluating process of the embodiment will be described along the flow diagram (Steps B1 to B7) of FIG. 2 with reference to FIGS. 3-7. FIG. 3 is a diagram illustrating an example of an image for describing a tracing process of FIG. 2; FIG. 4 is a diagram illustrating an example of an image for describing a tracking process of FIG. 2; FIG. 5 is a diagram illustrating an example of an image for describing an extracting process of FIG. 2; FIG. 6 is a diagram illustrating preferable and unpreferable examples of an image obtained in an evaluating process of the embodiment; and FIG. 7 is a diagram illustrating an example of a Graphic User Interface (GUI) output in a GUI outputting process of FIG. 2.

In an embodiment, observation and evaluation are made on seventeen parts of the left ventricular wall by referring to moving images of six basic cross sections obtained by ultrasonography of the heart of an adult of 16 years of age or older, for example. Then, whether or not each part is normally photographed is displayed to the examiner with the GUI. Each part may be photographed in any of six basic cross sections.

In the reference sign B1, moving images of six basic cross sections are input.

In the reference sign B2, the input moving images are categorized according to each cross section.

In the reference sign B3, the wall of the ventricle displayed in the input moving images is traced. In FIG. 3, the inside (in other words, the intima) of the left ventricle is traced as indicated by the broken line C1. The tracing may be performed by a machine learning process. The tracing may be performed on every 20-30 frames (in other words, 20-30 frames are skipped) of the categorized moving images.

In the reference sign B4, tracking is performed on each frame. As indicated by the reference sign C2 in FIG. 4, the position of the intima specified by the tracing on multiple (three in the example of FIG. 5) frames spaced apart from each other is estimated in the entire moving images by tracking. The tracking process may be performed by a rule-based system, such as the Lucas-Kanade method.

In the reference sign B5, an image is extracted around the trace line. As indicated by the reference sign C3 in FIG. 5, the image is extracted from all the frames of the moving images at a constant ratio along the specified trace line. In the example shown in FIG. 5, three rectangles obtained by dividing the trace line into three equal parts are extracted.

In the reference sign B6, whether a photographing state of the heart wall is fine or poor is determined for each extracted rectangle. The determination of being fine or poor may be performed by a machine learning process. When the moving image of a preferable example indicated by the reference sign D1 in FIG. 6 is photographed, since the position of the heart wall or the like is free from an unclear portion, the photographing state of the moving image is determined to be fine. In contrast, when the moving image of an unpreferable example indicated by the reference sign D2 in FIG. 6 is photographed, since the region enclosed by a white frame has a region of unclear imaging the heart wall, the photographing state of the moving image is determined to be poor.

In the reference sign B7, the result of the determination on the photographing state is displayed on the GUI. As indicated by the reference sign E1 in FIG. 7, six basic cross sections (two "Two chambers", two "Four chambers" and two "Long axis" in the example of FIG. 7) are associated with respective divisional regions of the GUI display. The numbers appearing on the GUI display indicated by the reference sign E1 are identifiers to identify the respective rectangles extracted in FIG. 5.

Figure 8:
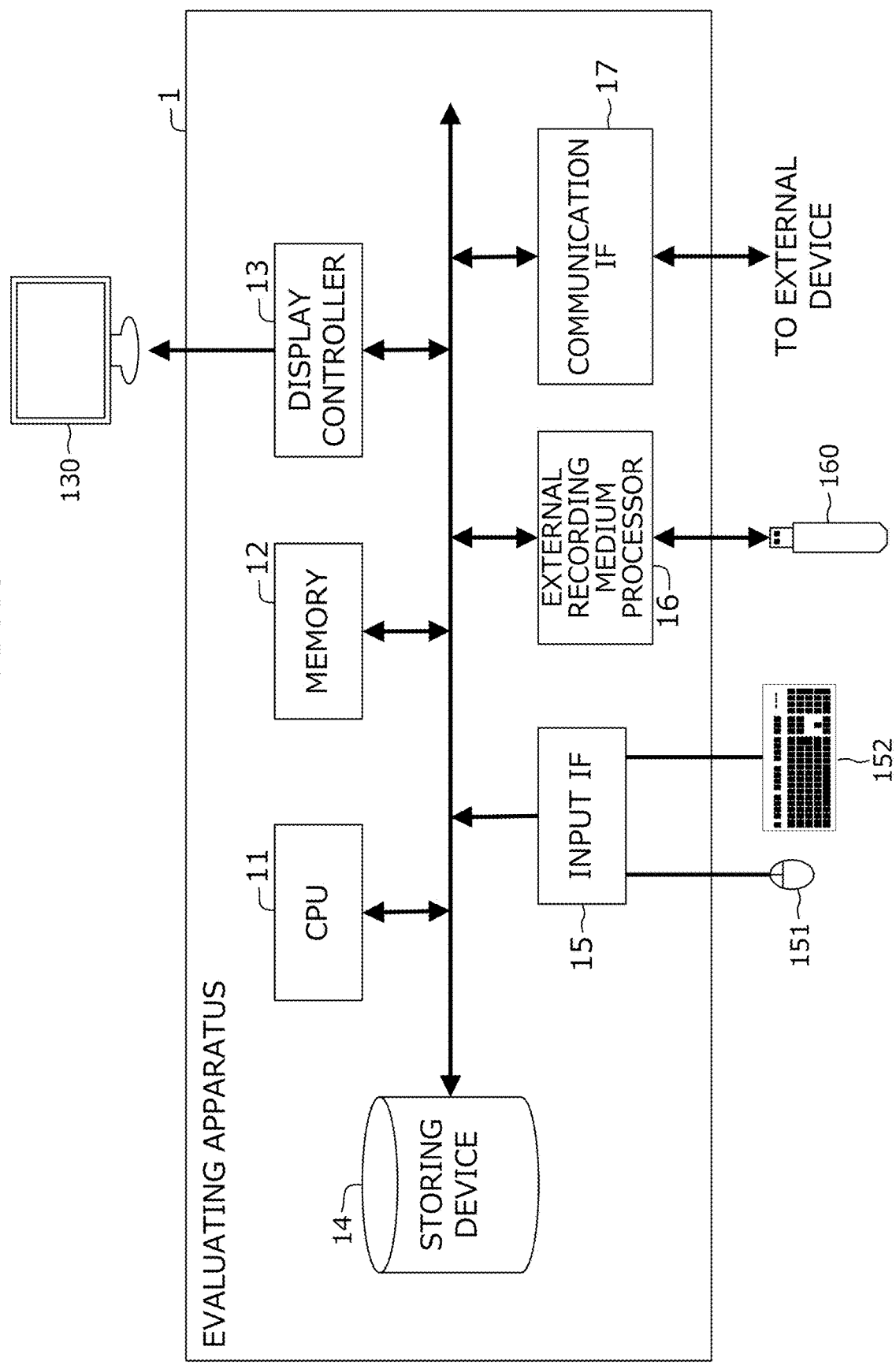
FIG. 8 is a block diagram schematically illustrating an example of a hardware configuration of an evaluating apparatus of the embodiment.

FIG. 8 is a block diagram schematically illustrating an example of a hardware configuration of an evaluating apparatus 1 of the embodiment.

As illustrated in FIG. 8, the evaluating apparatus 1 includes a CPU 11, a memory 12, a display controller 13, a storing device 14, an input interface (IF) 15, an external recording medium processor 16, and a communication IF 17.

The memory 12 is an example of a storing unit, and is exemplified by a Read Only Memory (ROM) and a Random Access Memory (RAM). Into the ROM of the memory 12, a program such as a Basic Input/Output System (BIOS) may be written. The software program in the memory 12 may be appropriately read and executed by the CPU 11. The RAM of the memory 12 may be used as a temporary recording memory or a working memory.

The display controller 13 is connected to a displaying unit 130 and controls the displaying unit 130. The displaying unit 130 is, for example, a LCD, an Organic Light-Emitting Diode (OLED) display, a Cathode Ray Tube (CRT) display, or an electronic paper display, and displays various types of information to the operator. The displaying unit 130 may be combined with an input device, and may be a touch panel.

Examples of the storing device 14 are a Dynamic Random Access Memory (DRAM), an SSD, a Storage Class Memory (SCM), and an HDD.

The input IF 15 may be connected to an input device such as a mouse 151 and/or a keyboard 152 and may control the input device such as the mouse 151 and/or the keyboard 152. The mouse 151 and the keyboard 152 are examples of the input device, and the operator makes various input operation through these input devices.

The external recording medium processor 16 is configured to be mountable with a recording medium 160. The external recording medium processor 16 is configured to read, under a state of being mounted with the recording medium 160, information stored in the recording medium 160. In this embodiment, the recording medium 160 is portable and is exemplified by a flexible disk, an optical disk, a magnetic disk, an optical-magnetic disk, or a semiconductor memory.

The communication IF 17 is an interface that enables the evaluating apparatus 1 to communicate with an external device(s).

The CPU 11 is an example of a processor and is a processing apparatus that carries out various controls and arithmetic operations. The CPU 11 achieves various functions by executing an operating system (OS) and a program read into the memory 12.

The apparatus that controls the operation of the overall evaluating apparatus 1 is not limited to the CPU 11, and may alternatively be either one of a Micro Processing Unit (MPU), a Digital Signal Processor (DSP), an Application Specific Integrated Circuit (ASIC), a Programmable Logic Device (PLD), and a Field Programmable Gate Array (FPGA). The apparatus that controls the operation of the overall evaluating apparatus 1 may be a combination of two or more of a CPU, an MPU, a DSP, an ASIC, a PLD, and an FPGA.

Figure 9:
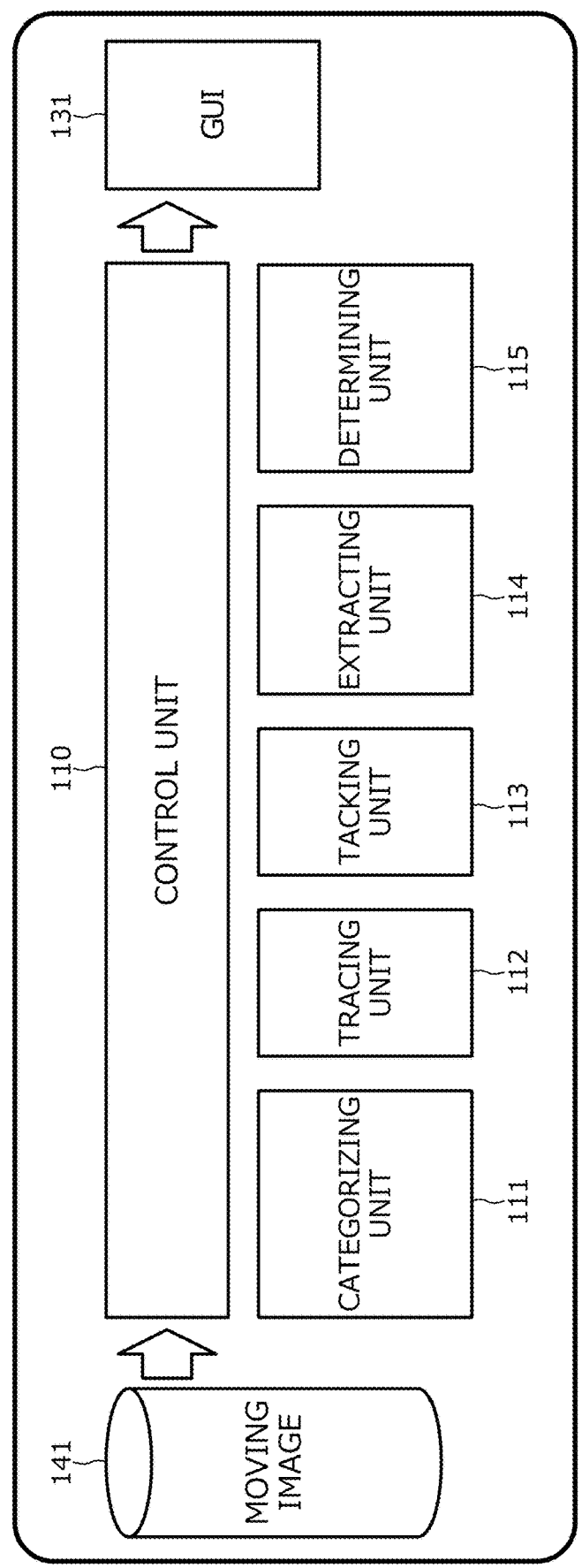
FIG. 9 is a block diagram schematically illustrating an example of a software configuration of the evaluating apparatus of the embodiment.

FIG. 9 is a block diagram schematically illustrating an example of a software configuration of the evaluating apparatus 1 of the embodiment.

The CPU 11 of the evaluating apparatus 1 functions as a control unit 110. The control unit 110 functions as a categorizing unit 111, a tracing unit 112, a tracking unit 113, an extracting unit 114, and a determining unit 115.

The categorizing unit 111 categorizes, for example, six input moving images 141 according to each basic cross section.

The tracing unit 112 traces the wall of the ventricle displayed in the input moving images. In other words, the tracing unit 112 specifies the wall of the inspection target in two or more moving images being obtained by photographing two types of cross sections of the inspection target, the two types of cross sections being orthogonal to each other. The tracing unit 112 may specify the position of the wall by machine learning performed on each of the two or more moving images.

The tracking unit 113 estimates the position of the intima in the entire moving images, which intima is specified by the tracing, by tracking on each frame. In other words, the tracking unit 113 specifies the wall on the basis of the result of the tracking of the part of the wall appearing in multiple frames of the two or more moving images.

The extracting unit 114 extracts multiple rectangles around the trace line from images.

The determining unit 115 determines whether the photographing state of the heart wall in each rectangle extracted by the extracting unit 114 is fine or poor, and outputs the result of the determination to a GUI 131. In other words, the determining unit 115 evaluates photographing quality of each of multiple first divisional regions obtained by dividing a region corresponding to the wall specified in a first image related to a first cross section among the two or more moving images. In addition, the determining unit 115 evaluates photographing quality of each of multiple second divisional regions obtained by dividing a region corresponding to the wall specified in a second image related to a second cross section among the two or more moving images, the second cross section being different from the first cross section.

The determining unit 115 may display a result of the evaluating the photographing quality of each first divisional region, which is related to a vertical cross section, in a radius direction of the circular GUI and also may display a result of the evaluating the photographing quality of each second divisional region, which is related to a horizontal cross section, in a circumference direction of the circular GUI. If at least either one of the evaluation result of a first divisional region and the evaluation result of a second divisional region corresponding to the first divisional region represents poor, the determining unit 115 may emphasize the display of the corresponding region (a position representing the poor result) of the GUI.

<B> Effects

Hereinafter, effects that can be achieved by the evaluating program, the evaluating apparatus 1, and the method for evaluating according to the embodiment will now be described.

The tracing unit 112 specifies the wall of the inspection target in two or more moving images being obtained by photographing two types of cross sections of the inspection target, the two types of cross sections being orthogonal to each other. The determining unit 115 evaluates the photographing quality of each of the multiple first divisional regions obtained by dividing the region corresponding to the wall specified in the first image related to the first cross section among the two or more moving images. In addition, the determining unit 115 evaluates the photographing quality of each of the multiple second divisional regions obtained by dividing the region corresponding to the wall specified in the second image related to the second cross section among the two or more moving images, the second cross section being different from the first cross section. As a result, the soundness and the like of the wall of the housing can be precisely evaluated.

The tracing unit 112 specifies the part including the wall by machine learning performed on each of the two or more moving images. The tracking unit 113 specifies the wall on the basis of the result of the tracking on the part including the wall appearing in multiple frames of the two or more moving images. This can precisely specify the wall of the inspection target.

The determining unit 115 displays the result of the evaluating the photographing quality of each first divisional region, which is related to the vertical cross section, in the radius direction of the circular GUI and also displays the result of the evaluating the photographing quality of each second divisional region, which is related to the horizontal cross section, in the circumference direction of the circular GUI. Thereby, the evaluation result can be output to the GUI.

If at least either one of the evaluation result of a first divisional region and the evaluation result of a second divisional region corresponding to the first divisional region is poor, the determining unit 115 emphasizes the display the corresponding region of the GUI. Consequently, this makes the examiner possible to recognize that the photographed moving image has a defect.

The inspection target is a human heart. With this configuration, in the inspection of the heart wall of a human, it is possible to recognize whether or not a photographed moving image has a defect, so that the soundness of the like of the heart wall can be precisely evaluated.

<C> Miscellaneous

The disclosed techniques are not limited to the embodiment described above, and may be variously modified without departing from the scope of the present embodiment. The respective configurations and processes of the present embodiment can be selected, omitted, and combined according to the requirement.

In the above embodiment, the evaluating process is performed on moving images obtained in an ultrasonic inspection on an adult heart, but the target of the evaluating process is not limited to this. The evaluating process may be performed on an infant heart or various organs and the like in various organisms including humans. Alternatively, the evaluating process may be applied to an internal inspection of a housing of a product at the time of factory shipment, periodic inspection, or the like.

A method used for capturing the moving images is not limited to ultrasonography, and may alternatively use various nondestructive inspections such as a Magnetic Resonance Imaging (MRI) inspection, a Computed Tomography (CT) inspection, and a mammography inspection.

As an aspect, the soundness or the like of the wall of a housing can be precisely evaluated.

In the claims, the indefinite article "a" or "an" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein an evaluating program for causing a computer to execute a process comprising:
    specifying a wall of an inspection target in two or more moving images being obtained by photographing two types of cross sections of the inspection target, the two types of cross sections being orthogonal to each other;
    evaluating photographing quality of each of a plurality of first divisional regions obtained by dividing a region corresponding to the wall specified in a first image related to a first cross section among the two or more moving images; and
    evaluating photographing quality of each of a plurality of second divisional regions obtained by dividing a region corresponding to the wall specified in a second image related to a second cross section among the two or more moving images, the second cross section being different from the first cross section.

2. The non-transitory computer-readable recording medium according to claim 1, wherein the specifying of the wall comprising:
    specifying a part including the wall by performing machine learning on each of the two or more moving images; and
    specifying the wall based on a result of tracking on the part including the wall in a plurality of frames of the two or more moving images.

3. The non-transitory computer-readable recording medium according to claim 2, wherein the inspection target is a human heart.

4. The non-transitory computer-readable recording medium according to claim 2, wherein
    the first cross section is a vertical cross section and the second cross section is a horizontal cross section; and
    the process further comprises displaying a result of evaluating the photographing quality of each of the plurality of first divisional regions in a radius direction of a circular Graphic User Interface (GUI) and displaying a result of evaluating the photographing quality of each the plurality of second divisional regions in a circumference direction of the circular GUI.

5. The non-transitory computer-readable recording medium according to claim 4, wherein the inspection target is a human heart.

6. The non-transitory computer-readable recording medium according to claim 1, wherein
    the first cross section is a vertical cross section and the second cross section is a horizontal cross section; and
    the process further comprises displaying a result of evaluating the photographing quality of each of the plurality of first divisional regions in a radius direction of a circular Graphic User Interface (GUI) and displaying a result of evaluating the photographing quality of each the plurality of second divisional regions in a circumference direction of the circular GUI.

7. The non-transitory computer-readable recording medium according to claim 6, wherein the process further comprises, in regard of one of the plurality of first divisional regions and one of the plurality of second divisional regions that correspond to each other, when at least either one of the result of evaluating the photographing quality of the one of the plurality of first divisional regions and the result of evaluating the photographing quality of the one of the plurality of second divisional regions presents a poor result, emphasizing display of a position representing the poor result in the circular GUI.

8. The non-transitory computer-readable recording medium according to claim 7, wherein the inspection target is a human heart.

9. The non-transitory computer-readable recording medium according to claim 6, wherein the inspection target is a human heart.

10. The non-transitory computer-readable recording medium according to claim 1, wherein the inspection target is a human heart.

11. An evaluating apparatus comprising:
    a memory; and
    a processor coupled to the memory, the processor being configured to:
        specify a wall of an inspection target in two or more moving images being obtained by photographing two types of cross sections of the inspection target, the two types of cross sections being orthogonal to each other;
        evaluate photographing quality of each of a plurality of first divisional regions obtained by dividing a region corresponding to the wall specified in a first image related to a first cross section among the two or more moving images; and
        evaluate photographing quality of each of a plurality of second divisional regions obtained by dividing a region corresponding to the wall specified in a second image related to a second cross section among the two or more moving images, the second cross section being different from the first cross section.

12. The evaluating apparatus according to claim 11, wherein the processor specifies the wall by:
   specifying a part including the wall by performing machine learning on each of the two or more moving images; and
   specifying the wall based on a result of tracking on the part including the wall in a plurality of frames of the two or more moving images.

13. The evaluating apparatus according to claim 11, wherein:
   the first cross section is a vertical cross section and the second cross section is a horizontal cross section; and
   the processor is further configured to display a result of evaluating the photographing quality of each of the plurality of first divisional regions in a radius direction of a circular Graphic User Interface (GUI) and display a result of evaluating the photographing quality of each the plurality of second divisional regions in a circumference direction of the circular GUI.

14. The evaluating apparatus according to claim 13, wherein
   the processor is further configured to, in regard of one of the plurality of first divisional regions and one of the plurality of second divisional regions that correspond to each other, when at least either one of the result of evaluating the photographing quality of the one of the plurality of first divisional regions and the result of evaluating the photographing quality of the one of the plurality of second divisional regions presents a poor result, emphasize display of a position representing the poor result in the circular GUI.

15. The evaluating apparatus according to claim 11, wherein the inspection target is a human heart.

16. A computer-implemented method for evaluating comprising:
   specifying a wall of an inspection target in two or more moving images being obtained by photographing two types of cross sections of the inspection target, the two types of cross sections being orthogonal to each other;
   evaluating photographing quality of each of a plurality of first divisional regions obtained by dividing a region corresponding to the wall specified in a first image related to a first cross section among the two or more moving images; and
   evaluating photographing quality of each of a plurality of second divisional regions obtained by dividing a region corresponding to the wall specified in a second image related to a second cross section among the two or more moving images, the second cross section being different from the first cross section.

17. The computer-implemented method according to claim 16, wherein the specifying of the wall comprising:
   specifying a part including the wall by performing machine learning on each of the two or more moving images; and
   specifying the wall based on a result of tracking on the part including the wall in a plurality of frames of the two or more moving images.

18. The computer-implemented method according to claim 16, wherein
   the first cross section is a vertical cross section and the second cross section is a horizontal cross section; and
   the method further comprises displaying a result of evaluating the photographing quality of each of the plurality of first divisional regions in a radius direction of a circular Graphic User Interface (GUI) and displaying a result of evaluating the photographing quality of each the plurality of second divisional regions in a circumference direction of the circular GUI.

19. The computer-implemented method according to claim 18, further comprising, in regard of one of the plurality of first divisional regions and one of the plurality of second divisional regions that correspond to each other, when at least either one of the result of evaluating the photographing quality of the one of the plurality of first divisional regions and the result of evaluating the photographing quality of the one of the plurality of second divisional regions presents a poor result, emphasizing display of a position representing the poor result in the circular GUI.

20. The computer-implemented method according to claim 16, wherein the inspection target is a human heart.

\* \* \* \* \*